UNITED STATES PATENT OFFICE.

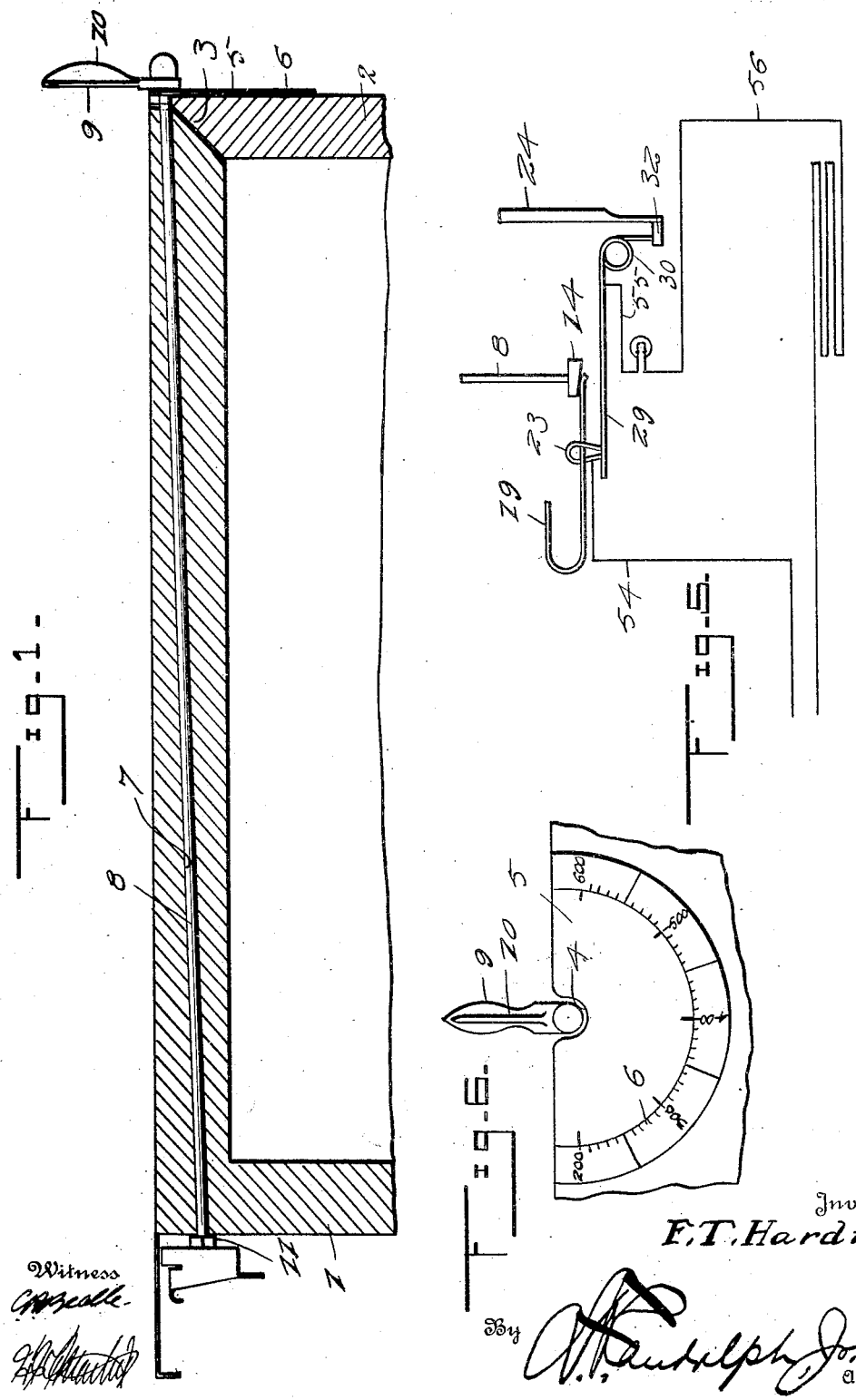

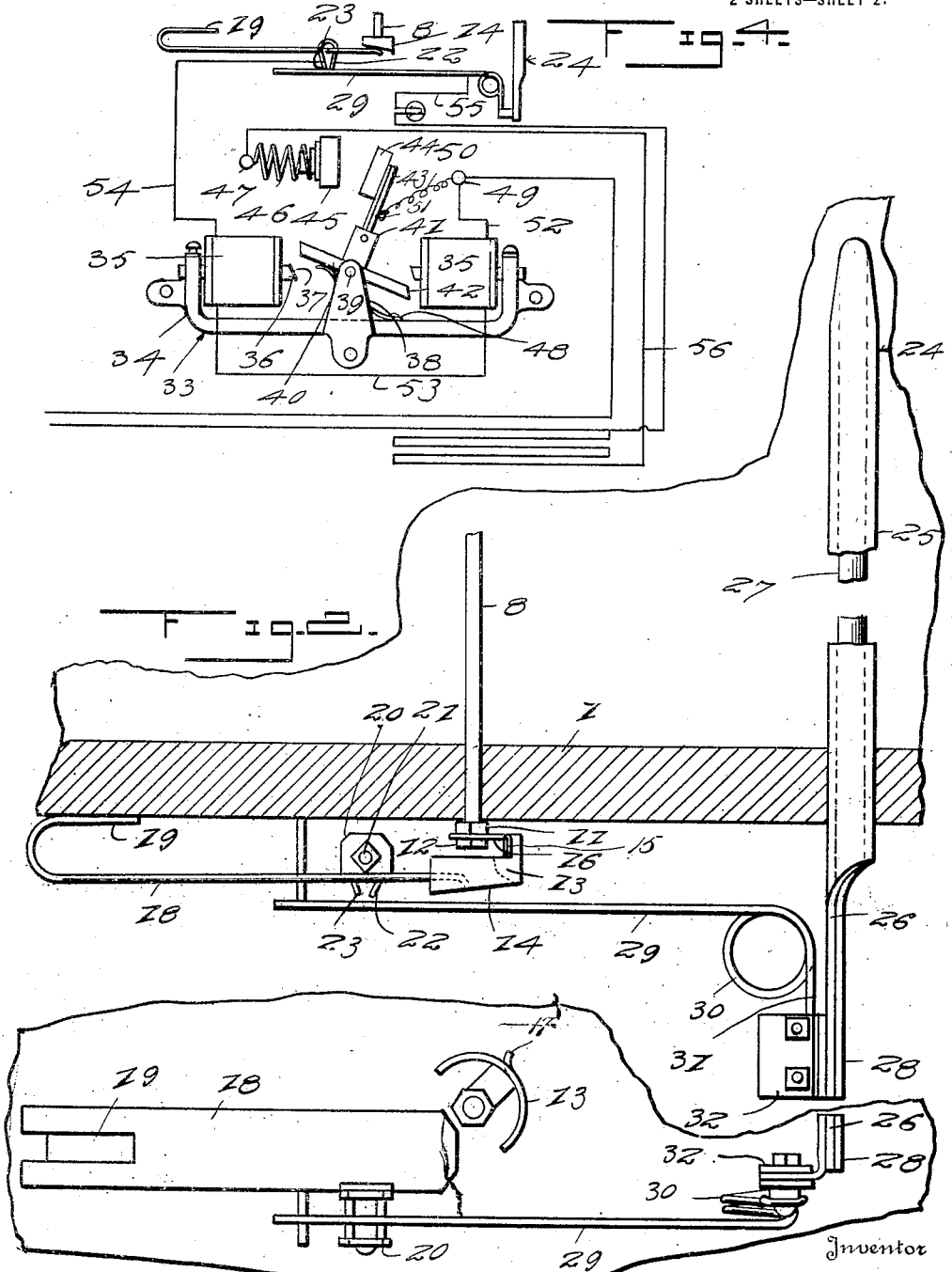

FREDERIC T. HARDING, OF ST. PAUL, MINNESOTA.

THERMOSTATIC TEMPERATURE-CONTROLLING DEVICE FOR ELECTRIC OVENS.

1,283,507.  Specification of Letters Patent.  Patented Nov. 5, 1918.

Application filed January 13, 1917. Serial No. 142,168.

*To all whom it may concern:*

Be it known that I, FREDERIC T. HARDING, a citizen of the United States, residing at St. Paul, in the county of Ramsey and State of Minnesota, have invented certain new and useful Improvements in Thermostatic Temperature-Controlling Devices for Electric Ovens; and I do hereby declare the following to be a full, clear, and exact description of the invention, such as will enable others skilled in the art to which it appertains to make and use the same.

This invention relates to new and useful improvements in thermostatic temperature controlling devices for electric ovens and the principal object of the invention is to provide a device which is adapted to automatically cut out and cut in an electric circuit when the temperature of an oven rises or falls above or below a predetermined point.

Another object of the invention is to provide a device which may be adjusted to increase or decrease the temperature at which the controller operates.

A further object of the invention is to provide a combined indicator by which the temperature may be controlled which also serves as a lock to hold the door of the oven closed.

A still further object of the invention is to provide a novel form of thermostat which may be located within the oven so as to insure the proper operation of the device.

Still another object of the invention is to provide a device for actuating a novel form of switch which is capable of being used in connection with either an alternating or direct current without danger of the contact being accidentally broken through the alternations when the device is used on an alternating current.

Still another object of the invention is to provide a means to prevent the cutting in of the heating element except through the proper method thereby avoiding danger of raising the temperature of the heating element too rapidly and causing injury to the same.

With these and other objects in view the invention consists in the novel combination and arrangement of parts which will be fully set forth in the following specification and accompanying drawings, in which:—

Figure 1 is a fragmentary view of an oven showing this device applied thereto.

Fig. 2 is a fragmentary horizontal sectional view through a portion of an oven showing this device applied thereto.

Fig. 3 is a fragmentary view in elevation showing the method of assembling the device.

Fig. 4 is a diagrammatic view of the device showing the method of using the same with an alternating circuit.

Fig. 5 is a view showing the device used in connection with a direct current circuit, and Fig. 6 is a fragmentary front elevation of the oven door showing the dial plate and indicator hand.

Referring to the drawings 1 designates an electric oven of any suitable construction provided with a door 2. This door is provided with a suitable flange 3 which is formed centrally with a recess 4. A suitable dial plate 5 which is preferably semi-circular in plan is provided and formed with a recess which alines with the recess 4 hereinbefore referred to at a point centrally of its straight edge. A series of graduations 6 are formed on the outer face of the dial plate as clearly illustrated in the drawings. A suitable bore 7 extends longitudinally through one of the walls of the oven 1 and extending through the bore 7 is a rod 8 carrying at one end a pointer 9 which is provided with a thumb piece 10 by means of which the pointer and rod are rotated. The rod as shown in the drawings extends beyond the end of the wall through which the bore 7 extends and is arranged to position the hand 9 in coöperative relation with the dial 5. The end of the rod 7 opposite that carrying the hand 9 is threaded and provided with a nut 11 against which the cam for adjusting the contact spring is supported. A clamp nut 12 is threaded on the extreme end of the rod 8 and coöperates with the nut 11 in holding the cam in proper place.

The cam above referred to comprises an arcuate body 13 having one edge inclined as at 14. The central portion of the opposite edge of said body is provided with an inwardly extending portion 15 having an ear 16 formed thereon which is bent at right angles to the plane of the cam and provided with an opening for the reception of the rod 8. This ear is fitted on the rod between the nuts 11 and 12 and it will thus be seen that the cam will be rotated with said rod. A suitable outturned stop 17 is carried by the cam and is arranged to limit the movement of said cam in order to prevent the hand 9 from moving off from the dial when the same is turned over the face of the dial until it indicates the highest temperature. This stop also prevents the hand from moving in a clockwise direction when the same hand is standing in a vertical position as shown in the drawings.

Attached to the rear wall of the oven is a spring 18 having a bent back attaching portion 19 formed at one end thereof while the opposite end bears against the inclined edge 14 of the cam 13. A suitable ear 20 is struck from the spring 18 near its free end and bent upwardly at right angles with relation thereto and formed with an opening for the reception of a bolt 21 which supports a contact designated generally by the numeral 22 in operative position with a contact arm which will be more fully hereinafter described. The contact 22 comprises a permanent magnet 23 having the ends of its arms coated with a suitable coating of copper or similar conductive but non-magnetic material.

The thermostatic element for the device is designated generally by the numeral 24 and comprises a tube 25 which is formed of a metal whose coefficient of expansion under the influence of heat is relatively small. This tube is cut away at one end and flattened to provide a tongue 26 as clearly shown in the drawings. A rod 27 formed of a metal whose coefficient of expansion under the influence of heat is relatively high extends through the tube 25 and has one end attached to the end of the tube by welding or by rivets and the opposite end of said rod is flattened to provide a tongue 28 which is riveted or otherwise rigidly attached to the tongue 26. The intermediate portion of said rod is free to slide through the tube and the thermostatic element above described is thrust through one of the walls of the oven so that the same will receive the full effect of the heat within the oven and it will be seen that as the expansion of the metal takes place the rod expanding greater than the tube will cause the extreme outer ends of the tongue to bend thereby operating the circuit closing arm which will be more fully hereinafter described.

The circuit closing arm above referred to is designated by the numeral 29 and is provided at one end with a loop 30 which terminates in an arm 31 which is secured in a suitable clamp 32. This clamp 32 is preferably of a suitable insulating material and is attached to the extreme outer end of the tongues 26 and 28 so that as said tongues bend the end of the arm will be moved.

It will be apparent from the foregoing that in use the spring 18 is connected to one terminal of a suitable power supply while the opposite terminal of said supply is connected direct to the heating element. The arm 29 is connected by a suitable wire to the opposite terminal of the heating element and it will thus be seen that the rise or fall of the temperature within the oven will be registered by the movement of the arm 29 and when the temperature rises beyond a predetermined point it will be seen that the current will be discontinued through the heating element and when it falls below a predetermined point it will be evident that the current will be continued through the heating element.

In the construction of the device used in connection with an alternating current the same type of circuit closer is used for controlling an auxiliary circuit which actuates suitable magnets and an electro magnetic switch by which the main circuit through the heating element is controlled.

The electromagnetic switch above referred to is designated generally by the numeral 33 and comprises a U-shaped frame 34 supporting at the ends of its arms a pair of magnets 35 the cores of which are extended as at 36 and provided with beveled ends 37. These cores are beveled in opposite directions as shown in the drawings and are adapted to attract the armature of the switch as will be more fully hereinafter described. Extending upwardly intermediate the ends of the bight portion of the U-shaped frame 34 are a pair of pedestals 38 the upper ends of which have mounted therein a suitable transversely extending shaft 39 on which the armature 40 is mounted. A suitable upwardly extending arm 41 is formed centrally of the armature and the ends of said armature are beveled in opposite directions as at 42 so that they will correspond to the bevel 37 on the extension 36 of the cores of the magnets. A suitable contact arm 43 is attached to but insulated from the arm 41 and carries a carbon block 44 which forms one terminal of the electric circuit which passes through the heating element. A suitable block 45 of carbon or any other similar material is supported at the end of a spring 46 which in turn is rigidly attached as at 47 to a suitable binding screw and this block 45 is held in such position that when the armature is attracted by the magnet, the block 44 will move into contact therewith thus completing the electric circuit through the heating element. In order to normally tend to throw the blocks 44 and 45 out of engagement, a suitable leaf spring 48 is attached to the frame 34 and has its free end bearing against the under side of the armature as will be clearly seen upon reference to the drawings. The energization of the magnets is controlled by means of the circuit closer previously described and upon reference to the wiring diagram it will be seen that one terminal of the line wire is connected to a suitable binding screw 49 from which the current is led through a wire 50 to the binding screw 51 on the arm 43. A suitable shunt wire 52 leads from the binding screw 49 to one of the magnets and the opposite terminal of said magnet is connected by a wire 53 to the opposite magnet which in turn is connected by a wire 54 to the contact 23 of the circuit closer. The arm 29 of the circuit closer is connected by a wire 55 through a suitable resistance lamp to the opposite line wire which is also directly connected to the heating element. The opposite terminal of said heating element is connected by a wire 56 to the binding screw 47 and thus it will be seen that the block 45 will be charged.

From the foregoing it will be seen that when the magnets 35 are energized by the closing of the circuit through the circuit closer the armature will be swung on its pivot so as to cause the blocks 44 and 45 to move into contact thereby completing the circuit through the heating element.

While in the foregoing there has been shown and described the preferred embodiment of this invention it is to be understood that such changes may be made in the combination and arrangement of parts as will fall within the spirit and scope of the invention as claimed.

What is claimed is:—

1. In a thermostatic circuit closer, a tube having a relatively low expansion coefficient under the influence of heat, a rod extending through said tube having a relatively high coefficient of expansion, the inner end of the rod being attached to the inner end of the tube, a tongue on the tube at its outer end, a tongue on the outer end of the rod, the tongues being attached together whereby when the tube and rod are affected by heat the tongues will bend and actuate a thermostat.

2. In a thermostatic circuit closer, a bendable tongue which bends under the influence of heat, a contact arm carried by said tongue, a permanent magnet in the path of movement of said arm, said magnet forming a contact for coöperation with the arm, a spring plate supporting the magnet and a rotatable cam adapted to move the free end of the spring plate to adjust the magnet with relation to the arm.

3. In a thermostatic circuit closer, a bendable tongue which bends under the influence of heat, a contact arm carried by said tongue, a permanent magnet in the path of movement of said arm, said magnet forming a contact for coöperation with the arm, a spring plate supporting the magnet, a cam for adjusting the plate relatively to the arm, a pointer for operating the cam and a dial coöperating with the pointer to indicate the various positions of adjustment.

In testimony whereof I affix my signature in presence of two witnesses.

FREDERIC T. HARDING.

Witnesses:
  Roy C. Elvin,
  Clarence H. Beglinger.